United States Patent [19]

Lazich

[11] Patent Number: 5,305,534

[45] Date of Patent: Apr. 26, 1994

[54] FISH LINE SINKER

[76] Inventor: Thomas A. Lazich, 11856 Bray St., Culver City, Calif. 90230

[21] Appl. No.: 16,569

[22] Filed: Feb. 11, 1993

[51] Int. Cl.⁵ .............................................. A01K 95/02
[52] U.S. Cl. .................................................... 43/44.91
[58] Field of Search ................... 43/44.9, 44.91, 44.95, 43/44.93

[56] References Cited

U.S. PATENT DOCUMENTS

| 3,273,278 | 9/1966 | Lynch | 43/44.9 |
| 3,808,728 | 5/1974 | Ratte, Jr. | 43/44.91 |
| 3,867,783 | 2/1975 | Simpson | 43/44.91 |
| 4,418,492 | 12/1983 | Rayburn | 43/44.9 |

FOREIGN PATENT DOCUMENTS

| 236996 | 2/1959 | Australia | 43/44.91 |
| 92208 | 9/1968 | France | 43/44.9 |

Primary Examiner—Paula A. Bradley
Assistant Examiner—Jeanne M. Elpel
Attorney, Agent, or Firm—I. Michael Bak-Boychuk

[57] ABSTRACT

A sinker assembly includes a fared sinker body of an elongate oval shape in which the longitudinal slots are formed in an orthogonal, crossing arrangement. The first of these slots extends to the lateral exterior of the body while the second one is fully within the body structure. A plastic retainer is then received into the second slot, and includes a longitudinal bead on its surface for compression against the slot edges formed at their crossing. The retainer may include a tab at one end and one end of the body may be cut away to accommodate this tab.

1 Claim, 2 Drawing Sheets

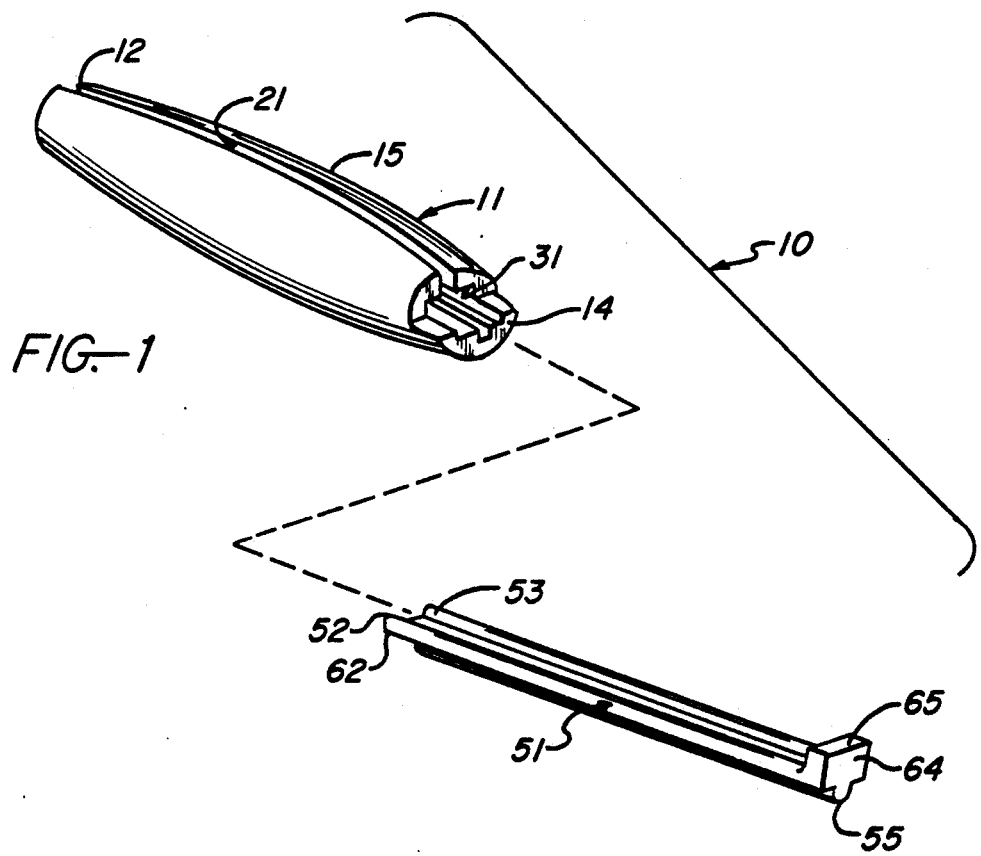
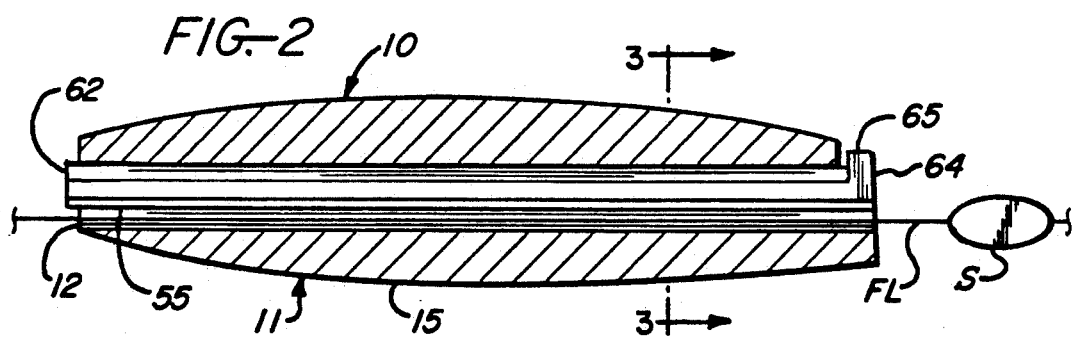

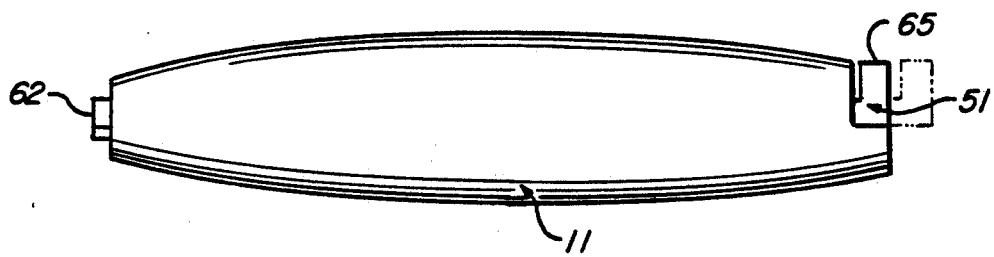
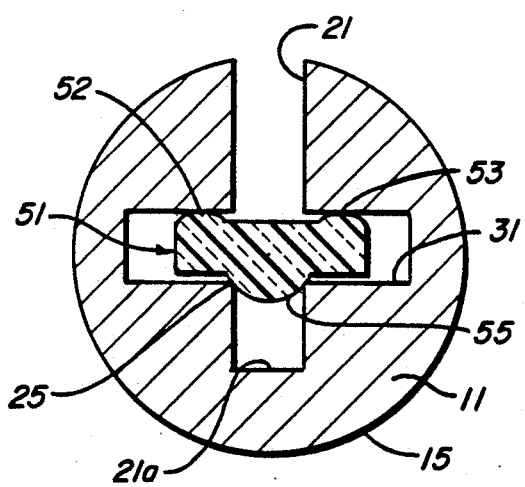
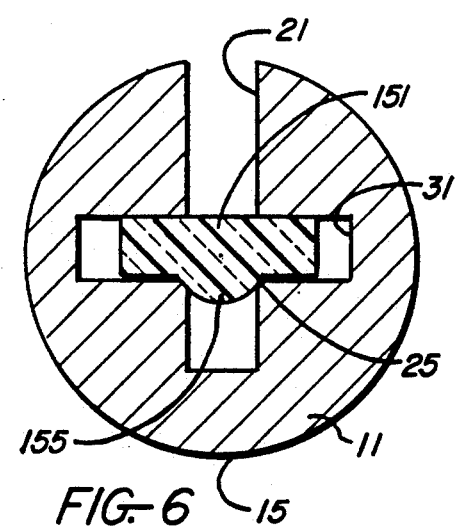
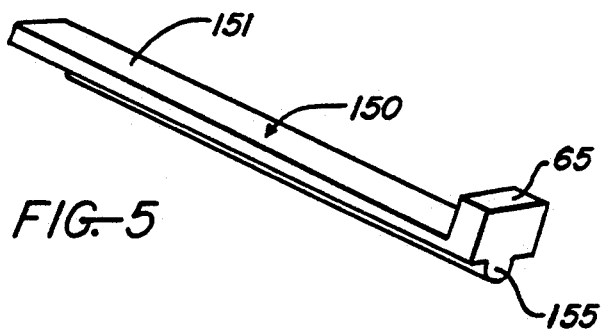

FISH LINE SINKER

BACKGROUND OF THE INVENTION

1. FIELD OF THE INVENTION

The present invention relates to fishing line sinkers, and more particularly to improvements in sinkers for their selective attachment to a fishing line.

2. DESCRIPTION OF THE PRIOR ART

Sinkers have been used extensively to bring fishing lines of the sea bottom. Most frequently, sinkers in the prior art take the form of a lead weight which is tied or fixed to the line in proximity with the fish hook. In consequence, the sinker often engages the subsurface growth and bottom debris and is often lost with the fishing line.

To reduce the incidence of fouling and the loss of fishing line, generally smoothed sinkers have been devised which engage the line directly. Examples of such prior art sinkers are set out in U.S. Pat. Nos. 3,808,728 to Ratte, Jr.; 2,570,293 to Vadmais; 3,096,599 to Baron; 4,691,468 to Fernbach; 3,043,044 to Metzler; and 2,772,509 to Vadmais. Additionally, means for selective engagement of floats to a fishing line are taught in U.S. Pat. Nos. 2,578,874 to Zaikoski; and 3,867,783 to Simpson. A further teaching of a fishing sinker is found in the lapsed Australia Application 236,996 to Powers.

Each of the foregoing, while suitable for the purposes intended, either secures by friction the sinker or float on the line or extends various structures which may be dislodged by underwater growth.

A sinker that is conveniently engaged for sliding translation along the fishing line is therefore extensively sought and it is one such sinker that is disclosed herein.

SUMMARY OF THE INVENTION

Accordingly, it is the general purpose and object of the present invention to provide a slotted lead sinker in which the slot emerges to the sinker side and in which the slot includes sharp edges for engaging a plastic retainer.

Other objects of the invention are to provide in a slotted lead sinker mechanical engagement surfaces for engaging a retainer.

Further objects of the invention are to provide a lead sinker conformed to slidably capture a fishing line in the interior of a longitudinal slot formed therein.

Yet further objects of the invention are to provide a sinker assembly which is convenient in engagement to a fishing line and which provides few projections for fouling.

Briefly, these and other objects are accomplished in the present invention by providing a sinker assembly comprising a generally oval, elongated lead sinker body slotted along the longitudinal axis thereof and a polymeric, elongated retainer receivable in the slot. More precisely, two longitudinally intersecting slot grooves, the first aligned generally radially to open on the side of the body and the second crossing the first throughout the body length, are formed in the body. A plastic strip is then formed as an elongated piece conformed to the dimensions of the second slot and defined by two parallel beads extending along the edges of one side thereof and an opposing central bead aligned centrally on the other side.

One end of the strip may then be bent over to form a transverse end projection, or tab, on the side provided with the parallel edge beads and the corresponding end of the body may be cut away in a notch to accommodate this tab. Preferably, the length of the strip is just slightly greater than the sinker body axial length and, accordingly, will extend beyond the body when engaged in the crossing slots. The central bead, moreover, is formed to a semicircular section of a diameter just longer than the width of the first slot, with the combined sectional thickness of the strip, and the central bead on the other side being greater than the depth of the second crossing slot. In this manner the central bead on the inserted strip is deformed at the sharp edges formed by the intersecting slots. Moreover, the two parallel edge beads are pushed into intimate contact against the walls of the second slot in the course of intersection.

The fishing line is then captured within the interior portion of the first slot and is restrained from unwanted passage around the inserted strip. Preferably, the sinker assembly is aligned on the fishing line with the tabbed end of the strip extending towards the line end of the assembly along the line towards end fittings like swivels, line ties, or hooks, then repeatedly drives the strip back into its retained position.

Alternatively, the plastic strip may be formed with the central bead extending on the side opposite the tab, the other surface of the strip being generally planar. The central bead then captures the fishing line within the bottom of the first slot.

In this manner a conveniently attachable sinker assembly is formed, with minimal parts and with fabrication convenience.

BRIEF DESCRIPTION OF THE DRAWINGS

FIG. 1 is a perspective illustration, separated by parts, of the inventive sinker assembly;

FIG. 2 is a side view, in partial section, of the inventive sinker assembly shown in FIG. 1;

FIG. 3 is a sectional view, taken along line 3—3 of FIG. 2, of the inventive sinker assembly;

FIG. 4 is a perspective illustration of the inventive sinker assembly illustrating the displacement of parts in the course of removal or installation;

FIG. 5 is a perspective illustration of an alternative retention strip useful with the present invention; and FIG. 6 is yet another sectional view illustrating the engagement of the structure shown in FIG. 5 within the sinker assembly.

DESCRIPTION OF THE PREFERRED EMBODIMENT

As shown in FIGS. 1-4, the inventive sinker assembly, generally designated by the numeral 10, comprises a lead sinker body 11 of a generally oval, elongated shape defined by a forward end 12 and a rear end 14. Between ends 12 and 14 the exterior of the body 11 is formed as a smooth, faired surface of revolution 15 of a smaller dimension at the ends and a thicker central section.

A first slot 21 is then formed to extend along the body 11, aligned radially from the exterior towards a slot bottom 21a. Thus, slot 21 is formed as a longitudinal opening throughout the body length, extending to its central axis. A second slot 31 is then formed in crossing sectional alignment with slot 21, again, extending between ends 12 and 14.

The intersection of slots 21 and 31 then defines sharp edged corners 25 along the slot length. A planar polymeric strip 51, made of resilient polymers like those in polyethylene, polypropyhene, or polyurethane groups, is then insertable into slot 31. Preferably, strip 51 is defined by parallel edges throughout its length, and may include two parallel edge beads 52 and 53 along the edges on one side thereof and a central, generally semicircular bead 55 on the opposite side. Beads 52, 53, and 55 extend over the full length of the strip 51 between the forward and rear ends 62 and 64 thereof. The rear end 64, moreover, may be provided with a cantilevered tab 65 projecting in the direction of the projection of bead 55. A corresponding notch 35 is then cut away, at the rear end 14 of body 11 in the direction of the emerging portion of slot 21.

The combined thickness of beads 52, 53 and 55 and the strip thickness therebetween is selected to be greater than the depth of slot 31. Moreover, the diameter of bead 55 is slightly larger than the width of slot 21. Thus, on insertion of strip 51 into slot 22, the sharp edges 25 at the crossing of slots 21 and 22 locally deform the received structure of bead 55. The resilient nature of the strip and this local surface deformation then assures a frictional engagement of strip 51 in body 11.

Preferably the length of strip 51 is somewhat greater than the length of body 11. On installation, the fishing line FL is received in the slot bottom 21a and then is captured there by the opposing compression of beads 52 and 53 against the walls of slot 22. Should removal be desired the projecting end 62 of strip 51 is pressed inwardly, displacing the strip to a position shown at II in FIG. 4. Thereafter finger manipulation for a complete withdrawal of the strip and the consequent removal.

Alternatively, as shown in FIGS. 5 and 6, another form of a retaining strip, generally designated by the numeral 150, is useful in securing the sinker assembly to the fishing line FL. In the course of description of this alternative form, like numbered parts function in like manner to that earlier described and reference therefore should be had to the teachings preceding.

Strip 150, once again, is formed as a generally elongate, flat structure defined by an elongated, rectangular body 151 provided with the tab 65 cantilevered from one end thereof. Extending on the side opposite to tab 65, in generally central alignment, is a semicircular bead 155 conformed for compression fit against the crossing edges 125 along the opening of the slot bottom 21a. The other side of strip body 151 may then be formed as a generally flat surface, the fishing line FL being captured within the slot bottom 21a by the compression fit of the bead 155 against edges 125.

While mounted on the fishing line FL it is preferred that the end 14 of body 11 be aligned towards the free end of the line. Then objects like swivels S (or other line protrusions, not shown) are effective in maintaining engagement. In this manner a conveniently installed and removable sinker assembly is devised.

Obviously many modifications and changes may be made to the foregoing description without departing from the spirit of the invention. It is therefore intended that the scope of the invention be determined solely on the claims appended hereto.

What is claimed is:

1. A fishing line sinker assembly conformed for selective, slideable engagement to a fishing line comprising:
   a generally oval sinker body formed of a metallic material structure defined by a front end and a rear end and a (fared) faired, generally oval, elongated exterior surface therebetween, said body further including a first slot extending through the length of said body between said front and rear end communicating to the exterior surface, and a second slot extending through said body in a transverse alignment with said first slot, said body including a recess proximate said rear end, and said first and second slots forming sharp edges at the intersection thereof;
   a plastic retainer of an elongate form received by said body characterized by generally parallel sides and a central bead formed longitudinally on a first surface thereof and an orthogonal tab formed at one end of (the) a second surface opposite said first surface, said central bead being of a cross section greater than the width of said second slot, said plastic retainer being formed to a longitudinal dimension greater than the length of said body between said front and rear ends, and said retainer including parallel beads along the longitudinal edges of said second surface.

* * * * *